No. 692,922. Patented Feb. 11, 1902.
J. J. SELDNER.
PROCESS OF TREATING GREASE CONTAINING MATERIAL.
(Application filed Mar. 27, 1901.)
(No Model.)

Witnesses
Inventor
Jonas J. Seldner
Attorneys

UNITED STATES PATENT OFFICE.

JONAS J. SELDNER, OF BALTIMORE, MARYLAND, ASSIGNOR TO UNIVERSAL CENTRIFUGAL DRYER COMPANY, OF BALTIMORE, MARYLAND, A CORPORATION OF MARYLAND.

PROCESS OF TREATING GREASE-CONTAINING MATERIAL.

SPECIFICATION forming part of Letters Patent No. 692,922, dated February 11, 1902.

Application filed March 27, 1901. Serial No. 53,040. (No specimens.)

*To all whom it may concern:*

Be it known that I, JONAS J. SELDNER, a citizen of the United States, residing at the city of Baltimore, in the State of Maryland, have invented certain new and useful Improvements in Methods of Treating Grease-Containing Material, &c., of which the following is a specification.

The present invention relates to an improved process or method of treating vegetable or animal material containing fat, oil, or other extractive matter, whereby the said extractive matter can be thoroughly removed without wasting or reducing the other liquid elements of the material treated.

Heretofore in treating offal, garbage, or other material for the purpose of extracting valuable matter therefrom it has been customary to introduce steam into the mass of material or to introduce water and heat the mixture by the use of steam applied to the rendering vessel or receptacle. While such a method will separate the grease or other matter to be extracted, it is evident that the residue remaining in the tank will have the nature and strength of its liquid elements weakened by the steam or water introduced to aid in freeing the extractive matter. This is objectionable, because it is customary to employ said residue as a fertilizer, and it is of course important that the elements thereof useful for such purpose should be of maximum strength—that is, with all of the processes heretofore in use for treating such material, so far as I am aware, the original liquid contents of the material have been weakened or reduced in strength by the action of the digesters or rendering apparatus. To avoid this and provide a process or method by means of which the matter to be extracted can be effectually removed from the material treated and a fertilizer containing the liquid elements of the original material undiluted by the addition of water or steam obtained is the object of my present invention.

The invention will be more particularly described in connection with the accompanying drawings, in which—

Figure 1:
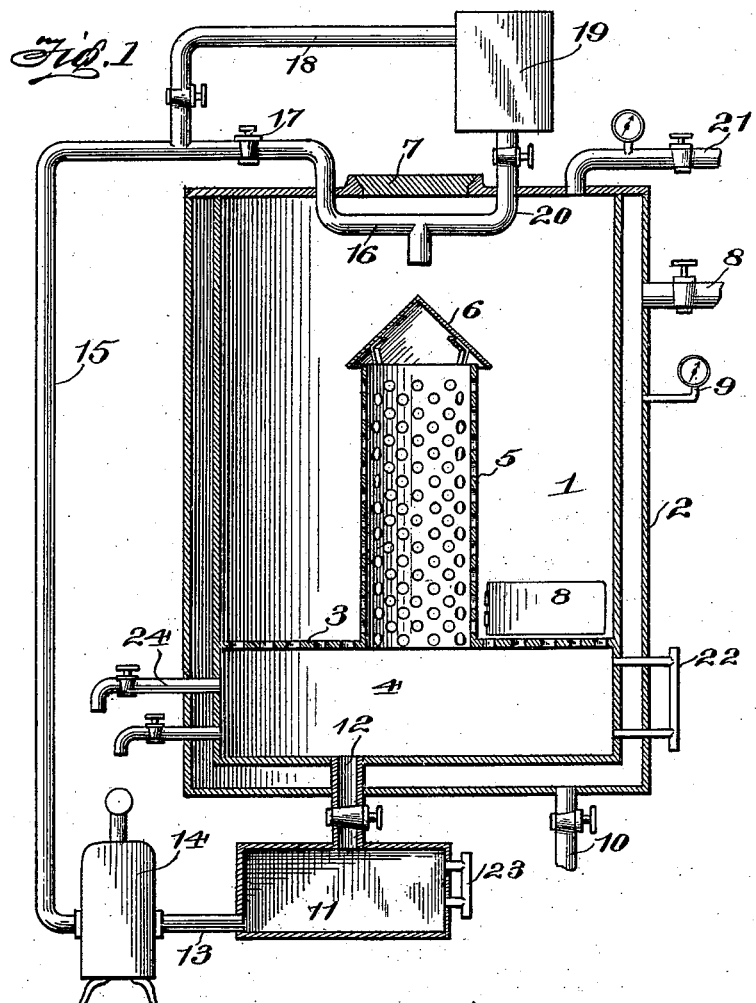
Figure 2:
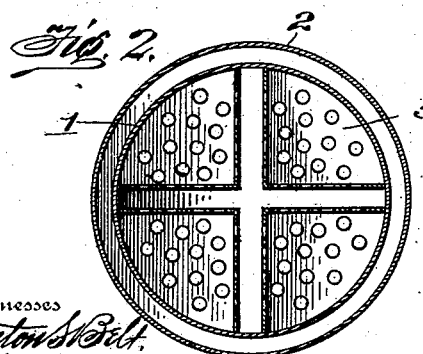
Figure 3:
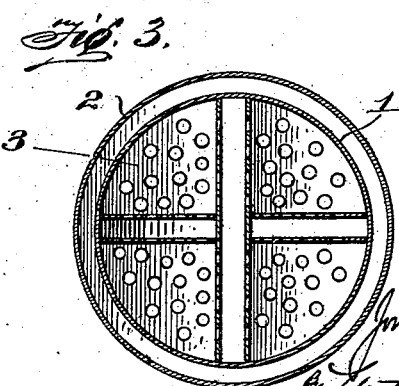

Figure 1 is a view, partly in section, of an apparatus for carrying out my invention, and Figs. 2 and 3 illustrate slightly-modified forms of digesters.

Referring to the drawings, 1 designates the body of the digesting or rendering tank, which may be of any suitable size. This tank or vessel is surrounded, except at the top, by a steam-jacket 2 and is interiorly divided into two compartments or chambers by a transverse horizontal partition 3. This partition is preferably formed with a series of minute perforations, such as will permit the passage of liquid from the main upper chamber to the lower chamber 4, such perforations or openings being of such reduced size that particles of solid material will be prevented from passing into the lower liquid-chamber. Said division 3 is also provided with a central opening or aperture, into which is fitted the lower end of a perforated tube 5, which extends upwardly within the rendering-tank. Above the upper end of this tank 5 is arranged an inverted conical-shaped cover or shield 6 for a purpose to be hereinafter described.

In the top of the tank or vessel 1 is formed a suitable inlet-opening adapted to be closed by a door or cover 7, and a door 8 is formed in said tank, near the lower end thereof, through which the residue remaining after the grease or other matter has been extracted from the material treated may be withdrawn. Steam may be supplied to the jacket 2 through a valved pipe 8, a steam-gage 9 being provided for indicating the amount of pressure in said jacket at any time. A return steam-pipe 10 communicates with the lower portion of the steam-jacket for returning the steam to the boiler, where it is generated.

Below the rendering-tank is arranged a smaller tank or receptacle 11, communicating through a valved pipe 12 with the liquid-chamber 4 of the rendering vessel and through a pipe 13 with a pump 14. A pipe or duct 15 extends from the pump through an aperture or opening in the top of the rendering-tank and connects with one end of a distributing-duct 16, arranged within the upper portion of the tank and having its delivery-opening directly above the apex of the conical-shaped shield or cover for the centrally-arranged perforated pipe 5. A valve 17 is placed in the pipe 15 to regulate the passage of liquid from the pump to the interior of the tank 1, and a valved branch pipe 18 connects said pipe 15 with a reservoir or elevated tank 19. Said reservoir has a valved outlet-pipe 20, which also extends through the top of the rendering-tank and is connected to the discharge-pipe 16 therein. The tank is also provided with a vapor-escape tube or pipe 21, and the liquid chamber or compartment 4 of the digester and the tank 11 are respectively provided with gages 22 23 for indicating the heights of liquid therein. Said liquid-chamber 4 is also provided with any suitable number of cocks or faucets 24 for drawing off the grease or oil from the liquid received in said chamber.

The manner of using the apparatus above described in carrying out my improved process is as follows: The material from which grease is to be extracted or removed and which may afterward in many instances be used as a fertilizer is introduced through the feed aperture or opening at the top of the tank, after which the door or cover 7 is applied and tightly secured in position. Steam is then admitted to the jacket 2, and as the material deposited within the tank upon the perforated floor or partition 3 becomes heated the liquid elements thereof will be separated from the solid matter and pass through the perforations in the said floor or through the perforations in the central tube 5 into the liquid chamber or compartment 4. The grease being of lighter specific gravity will float or rise to the top of the liquid in the chamber 4 and may be drawn off through the cocks 24, the gage 22 serving to indicate the exact amount of liquid and the relative proportion of grease at any time. When practically all of the grease collected in said chamber 4 has been withdrawn, the valve in the pipe 12 can be opened and the remaining liquid allowed to pass into the tank 11. By means of the pump 14 said liquid will be carried through the pipes 15 and 16 and discharged into the tank, being by means of the conical cap 6 caused to fall over a relatively large portion of the material being treated. This liquid, which, it will be noticed, is obtained entirely from the material being digested and is undiluted or weakened by the addition of any water or steam, is thus caused to repeatedly percolate through the mass of material in the digester, and thereby all of the grease contained therein is extracted. The temperature or pressure of steam required to separate the liquid elements from the solid portion of the material treated will vary according to the nature of such material. I have found that in treating some materials it is necessary to introduce steam at a pressure of as high as ninety pounds to the steam-jacket of the rendering vessel, while with other material and when the rendering is effected in a vacuum, as hereinafter described, a steam-pressure of only four or five pounds will be sufficient. If for any reason it is not desired to introduce the liquid passing through the pipe 15 directly into the digesting-tank, the valve 17 may be closed and such liquid delivered to the elevated reservoir 19, through which it can be withdrawn as desired through the pipe 20. After the grease has been extracted in the manner described the residue can be withdrawn through the door 8 and treated in a suitable drying apparatus. It will be seen that the resulting product will contain all of the elements of the original material, thereby producing a higher grade or better quality of fertilizer than is obtainable when the methods commonly in use are followed.

The advantages of the method hereinbefore described will be readily appreciated. It frequently happens that the liquid elements of material to be treated in such an apparatus contain a very high percentage of valuable fertilizing material, and if, as has been the ordinary practice, water or steam is admitted to the material in the tank the strength of such liquid element is greatly reduced, if it is not entirely wasted. By my method also a great saving of time is effected. If the original liquid element of the material is increased by the addition of water or steam, such additional amount of moisture has of course to be evaporated before the product will be brought to the proper condition for use as a fertilizer.

In some cases it is desirable to subject the material to the action of an acid, and by following my invention the same quantity of acid can be repeatedly circulated through the material without having its strength reduced, as it would be if water or steam were admitted to the digesting vessel.

If desired, the lower compartment or chamber 4 of the digesting-tank may be connected with an air-exhausting pump and a partial vacuum created therein. This will act to draw into said compartment the matter extracted by heat from the material in the other chamber of the tank.

Instead of arranging a cylindrical perforated tube 5 centrally within the upper chamber of the rendering-tank, as shown in Fig. 1 and above described, said upper chamber may be divided by perforated partitions of the forms shown in Figs. 2 and 3. Such constructions as are illustrated in the last said figures cause the material to be treated to be divided into a series of relatively smaller masses from which the extractive matter can be more readily withdrawn and conducted to the chamber 4.

Having thus described my invention, what I claim as new, and desire to secure by Letters Patent, is—

1. The herein-described method of treating animal or vegetable material to extract matter therefrom, consisting in heating the material in a closed vessel, collecting the liquid expelled from the material by such heating, withdrawing the desired matter from said liquid, and returning the remainder of the liquid to the material within the heating vessel.

2. The herein-described method of treating animal or vegetable material to extract matter therefrom, consisting in heating the material in a closed vessel, collecting the liquid expelled from the material by such heating, withdrawing the desired matter from said liquid, and repeatedly returning the remainder of the liquid to the material within the heating vessel.

3. The herein-described method of treating animal or vegetable material, consisting in heating the material in a closed vessel to expel the liquid contents thereof, and returning said liquid and passing it through said material repeatedly, for the purpose set forth.

4. The herein-described method of treating oil-containing material, consisting in heating the material to separate the oil and other liquid elements therefrom, separating and withdrawing the oil from the other liquid and returning the remainder of the liquid to the heating vessel.

5. The method of treating animal or vegetable material to extract oil or grease therefrom which consists in heating said material to expel liquid therefrom, separating out from said liquid the oil and grease therein, and returning the remaining liquid to the material under treatment to serve as a vehicle for conveying further oil and grease from said material.

In testimony whereof I affix my signature in presence of two witnesses.

JONAS J. SELDNER.

Witnesses:
JOHN W. HEWES,
MARK A. ELLIOTT.